United States Patent
Schiccheri et al.

(10) Patent No.: US 9,757,896 B2
(45) Date of Patent: Sep. 12, 2017

(54) METHOD OF LASER WELDING OF AN AUTOMOTIVE LIGHT

(71) Applicant: Automotive Lighting Italia S.p.A. a Socio Unico, Turin (IT)

(72) Inventors: Nicola Schiccheri, Turin (IT); Cristiano Boero, Turin (IT); Domenico Ferigo, Turin (IT); Fabio Leone, Turin (IT)

(73) Assignee: Automotive Lighting Italia S.p.A. a Socio Unico, Turin (IT)

( * ) Notice: Subject to any disclaimer, the term of this patent is extended or adjusted under 35 U.S.C. 154(b) by 150 days.

(21) Appl. No.: 14/723,782

(22) Filed: May 28, 2015

(65) Prior Publication Data

US 2015/0343701 A1 Dec. 3, 2015

(30) Foreign Application Priority Data

May 30, 2014 (IT) .............................. PD2014A0135

(51) Int. Cl.
*B29C 65/16* (2006.01)
*B29C 65/00* (2006.01)
(Continued)

(52) U.S. Cl.
CPC ........ *B29C 65/1638* (2013.01); *B29C 65/167* (2013.01); *B29C 65/1635* (2013.01);
(Continued)

(58) Field of Classification Search
CPC ............ B29C 65/1638; B29C 65/1635; B29C 65/1661; B29C 65/1664; B29C 65/1667;
(Continued)

(56) References Cited

U.S. PATENT DOCUMENTS

2006/0186095 A1 8/2006 Kan et al.
2012/0241424 A1 9/2012 Sagesaka et al.

FOREIGN PATENT DOCUMENTS

| DE | 102006008060 A1 | 8/2006 |
| FR | 2952316 A1 | 5/2011 |
| JP | 2013196891 A | 9/2013 |
| JP | 2014061639 A | 4/2014 |

OTHER PUBLICATIONS

Machine translation of FR 2952316.*
(Continued)

*Primary Examiner* — Vishal I Patel
(74) *Attorney, Agent, or Firm* — Howard & Howard Attorneys PLLC

(57) ABSTRACT

Method of manufacture of an automotive light comprising the steps of providing a container body delimited by a first perimetral profile, providing a lenticular body, internally delimited by a second perimetral profile and externally by an outer edge corresponding to said second perimetral profile, wherein the container body acts as an absorbent element of the light beam and the lenticular body acts as a transmission element of the light beam, providing optical devices for changing the divergence of the portions of laser beams in output from the fibers, so as to collimate them overall along at least one predetermined optical axis. The method further comprises the steps of directing on a critical portion of the welding interface at least a first laser beam emitted by a respective fiber lying on an optical plane incident with said critical portion of the welding interface.

22 Claims, 15 Drawing Sheets

(51) Int. Cl.
*F21S 8/10*  (2006.01)
*B29L 31/00*  (2006.01)

(52) U.S. Cl.
CPC ...... *B29C 65/1664* (2013.01); *B29C 65/1667* (2013.01); *B29C 65/1687* (2013.01); *B29C 65/1696* (2013.01); *B29C 66/114* (2013.01); *B29C 66/131* (2013.01); *B29C 66/24244* (2013.01); *B29C 66/542* (2013.01); *B29C 66/9592* (2013.01); *B29C 65/1661* (2013.01); *B29L 2031/747* (2013.01); *F21S 48/1208* (2013.01); *F21S 48/1233* (2013.01); *F21S 48/2206* (2013.01)

(58) Field of Classification Search
CPC .............. B29C 65/167; B29C 65/1687; B29C 65/1696; B29C 66/114; B29C 66/131; B29C 66/24244; B29C 66/542; B29C 66/9592; F21S 48/1233; F21S 48/1208; F21S 48/2206; B29L 2031/747
See application file for complete search history.

(56) References Cited

OTHER PUBLICATIONS

Machine translation of JP20131986891A.*
Search Report dated Jan. 28, 2015 for Italian Patent Application No. PD20140135.

* cited by examiner

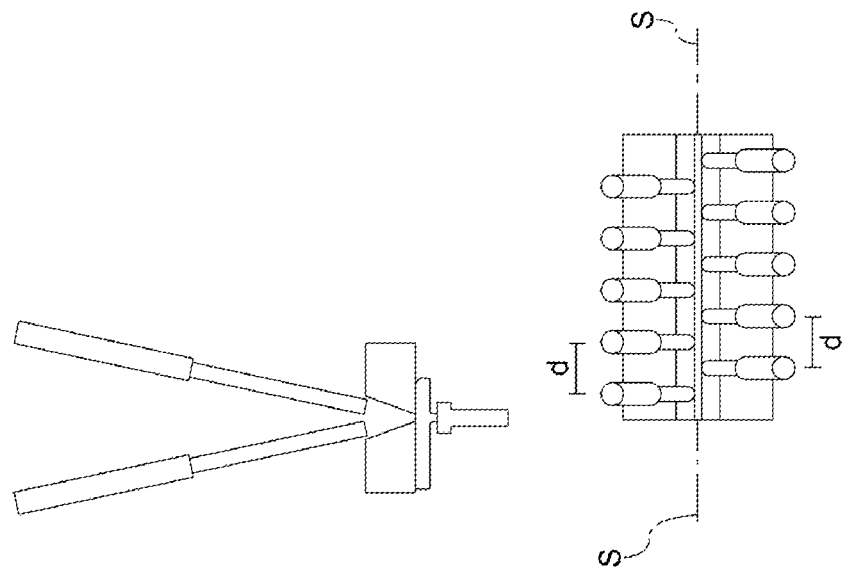
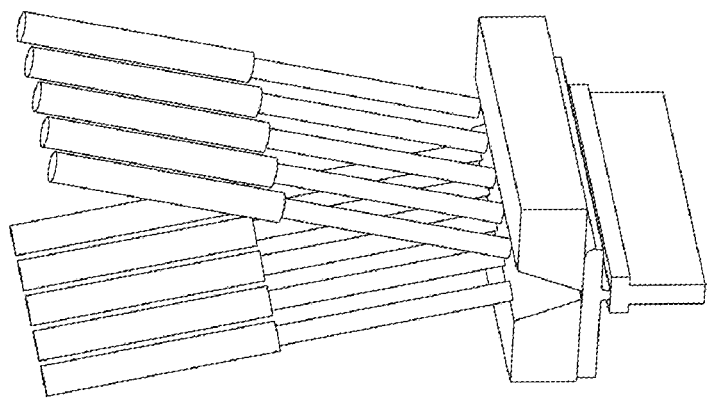
Fig.3

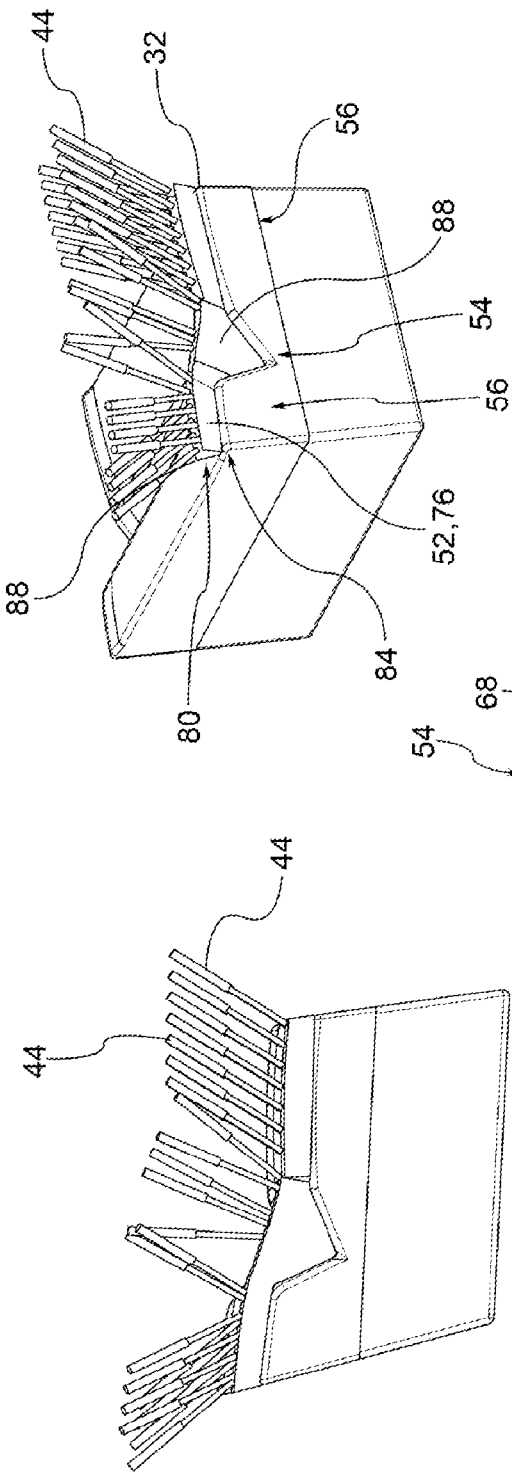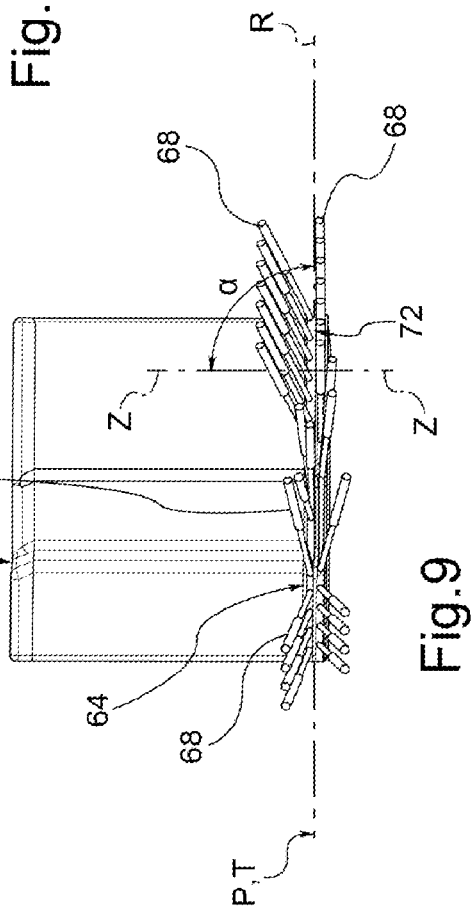

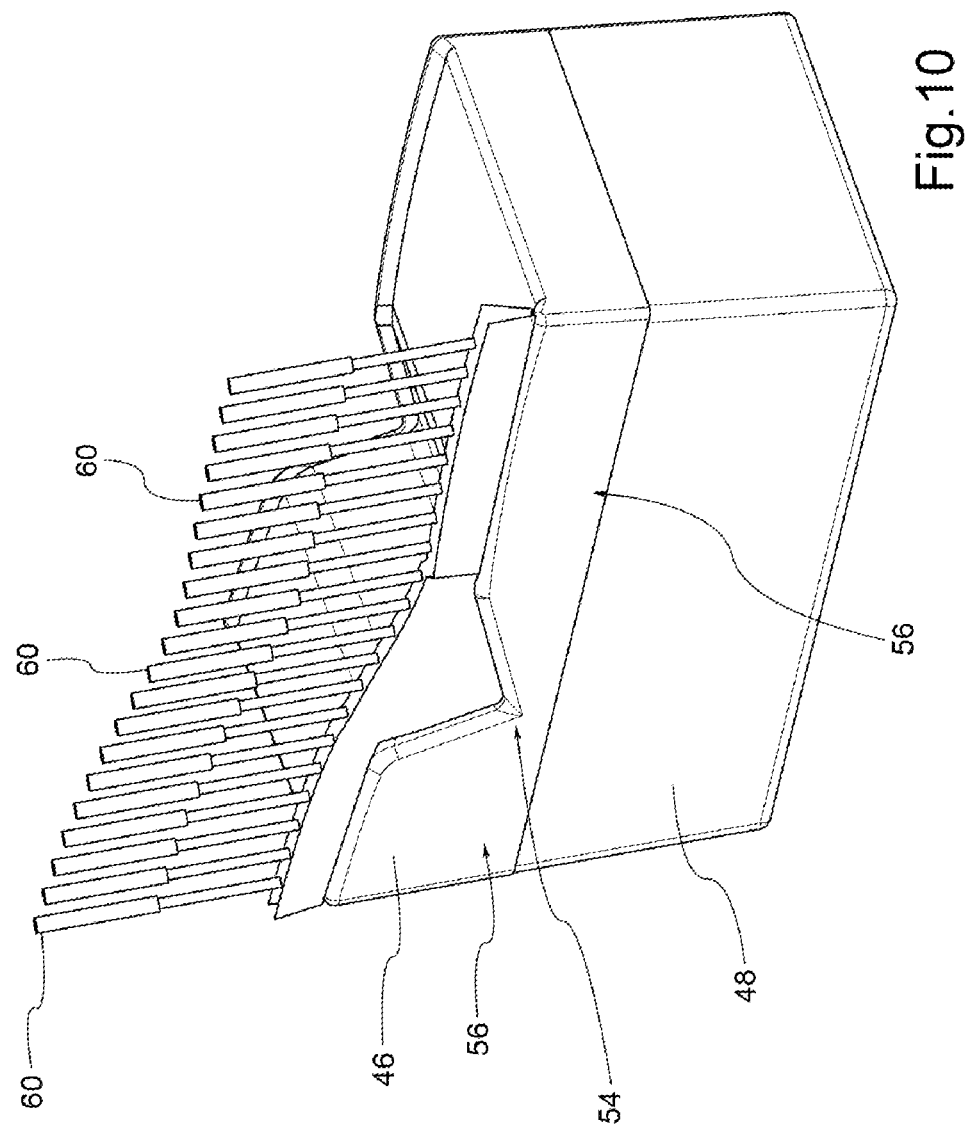

METHOD OF LASER WELDING OF AN AUTOMOTIVE LIGHT

CROSS-REFERENCE TO RELATED APPLICATIONS

The present application claims priority to and all the benefits of Italian Patent Application No. PD2014A000135, filed on May 30, 2014, which is hereby expressly incorporated herein by reference in its entirety.

BACKGROUND OF THE INVENTION

Field of the Invention

The present invention relates to a method of laser welding of an automotive light and relative automotive light obtained using said method.

Description of the Related Art

The term automotive light is understood to mean indifferently a rear automotive light or a front automotive light, the latter also known as a headlight.

As is known, an automotive light is a lighting and/or signalling device of a vehicle comprising at least one external automotive light having a lighting and/or signalling function towards the outside of the vehicle such as for example a sidelight, an indicator light, a brake light, a rear fog light, a reverse light, a dipped beam headlight, a main beam headlight and the like.

The automotive light, in its simplest form comprises a container body, a lenticular body and at least one light source.

The lenticular body is placed so as to close a mouth of the container body so as to form a housing chamber. The light source is arranged inside the housing chamber, which may be directed so as to emit light towards the lenticular body, when powered with electricity.

The method of manufacture of an automotive light, once assembled the various components, must provide for the attachment and hermetic sealing of the lenticular body to the container body.

Such sealing and attachment is usually performed by welding so as to create a weld bead between the perimetral profiles, respectively, of the lenticular body and the container body placed in contact with each other.

Naturally, the welding may also regard other components of a more complex automotive light, for example arranged inside the housing chamber.

A process of laser welding of polymeric bodies particularly of an automotive light makes it to combine a transmissive polymeric body, capable of transmitting a laser radiation, and an absorbent polymeric body, capable of absorbing the laser radiation. In the present case, the laser radiation is transformed into heat when it encounters the absorbent polymeric body which heating locally transfers heat to the transmissive polymeric body, as far as a softening and a local melting of both polymeric bodies, which thus join firmly to each other.

The absorbent polymeric body of an automotive light may be constituted, for example, by the container body, while the transmissive polymeric body of a automotive light may be constituted, for example, by the lenticular body, which closing the container body forms a housing chamber housing a light source of the automotive headlight.

Said housing chamber is delimited at the perimeter by the perimetral profiles of the container body and of the lenticular body which, placed in contact with each other, are sealed by the formation of a weld bead, at which the interpenetration of the materials of the lenticular body and the container body takes place.

Of course, the absorbent and transmissive polymeric bodies may be composed generically of further polymeric components of the automotive headlight.

As regards the laser equipment to be used, this generally comprises:
- at least a laser source, which can for example be a semiconductor laser source,
- a system of optical fibres grouped together in a "bundle" which serves to transport the laser light produced by the laser source, in the vicinity of the lenticular body,
- an optical fibre support which has the purpose of holding the optical fibres in position in the vicinity of the lenticular body. For example, the support may be a metal body with housing holes in which the optical fibres are contained. They may be attached by a system in which the head of a screw, which is screwed to the metal support of the optical fibres, presses a polymer washer which expands radially. The optical fibre is thus blocked by the polymer washer on the housing hole walls,
- an optical system, with the function of a collimator, which has the purpose of modifying the divergence of the laser beam coming out of the fibre and directing said beam towards the weld bead.

Typically, as a collimator, a negative light guide is used, i.e. a light guide formed of reflective walls inclined with respect to the optical axis of the fibre.

In the simplest version of the prior art (FIG. 1), the light guide has a geometry with reflecting walls inclined with respect to its optical axis and the optical fibre is positioned in the vicinity of the upper opening of the light guide and along the optical axis. Again in the simplest case, the system proves to be symmetric on the transversal plane of the light guide, i.e. the inclination of the reflective walls of the light guide is the same with respect to the optical axis. Longitudinally, the light guide extends along the trajectory which defines the weld bead.

A parameter which is related to the distribution of the optical fibres along the trajectory of the weld bead is the distance or pitch 'd' between the fibres, the minimum value of which is given by the dimensions of the optical fibres and of the attachment system and the maximum value of which is conditioned by the minimum value of energy deposited on the bead.

This configuration is generally used when the system, i.e. the light to be welded, has a simple geometry.

Where the radiation energy deposited on the weld bead needs to be increased, for example when the thickness of the lenticular body is high with a consequent increase of the absorption by the material, two rows of optical fibres may be used on the same light guide (FIGS. 2-3). The optical fibres may be arranged on the same transversal plane (FIG. 2) or on different transversal planes (FIG. 3).

In the first case the optical fibres belonging to the same transversal plane are pointed on the same region of the weld bead.

In the second case the optical fibres, lying on different planes, point in different areas of the weld bead with the aim of making the irradiation more even.

The lenticular body may however have a complex geometry for stylistic and aerodynamic reasons. On account of such, the weld bead proves not conformal to the lenticular body, i.e. it may not be a translation of the lenticular body.

However a continuous and homogeneous irradiation along the weld bead must be ensured even if the lenticular body has an uneven surface.

With the solutions of the prior art, i.e. with the configuration in which the fibres are inclined with respect to the optical axis on a plane transversal to the weld bead, a non-uniform irradiation is created due to the presence of shadow zones. In FIG. 4, the presence of a shadow zone in the irradiation of the weld bead in areas with complex geometries or irregular areas of the lenticular body has been highlighted. The same FIG. 4 also shows how, thanks to the present invention, it is possible to fill said shadow zone in order to obtain a uniform and regular weld, as better described below.

It follows that, in the case of welding automotive lights where the lenticular body usually has complex geometries (such as variations of concavities/complexity, grooves, ribs, protuberances, and the like), the solutions of the prior art of laser welding are not satisfactory in terms of quality of the weld bead generated.

In the light of all the above considerations, laser welding techniques are little used to date on automotive lights, especially if they have a complex geometry; such laser welding techniques are thus replaced by alternative welding techniques, such as friction, ultrasonic, hot-plate welding and the like.

SUMMARY OF THE INVENTION

The purpose of the present invention is to obtain a method of laser welding of an automotive light and an automotive light obtained using said method able to ensure a laser welding process making it possible to obtain a quality weld with any geometry of the lenticular body, even if highly complex and strongly variable in its extension.

The purpose of the present invention is therefore to perform welding of automotive lights by means of a laser welding technique overcoming the technical drawbacks related to the specific nature of automotive lights which to date make said welding technique not very efficient.

Such purpose is achieved by a method of manufacture of an automotive light comprising the steps of: providing a container body delimited by a first perimetral profile, providing a lenticular body, internally delimited by a second perimetral profile and externally by an outer edge corresponding to said second perimetral profile, the method further including the steps of mutually associating at least partially the respective first and second perimetral profiles of the container body and of the lenticular body, wherein the contact surface between said perimetral profiles defines a welding interface which extends along a curve defined by a curvilinear abscissa, and providing at least one laser emitting device which emits a light beam or radiation having a characteristic emission spectrum. In addition, the method includes the steps of providing a plurality of fibres which receive portions of the laser beam from the laser emitting device and direct them towards the welding interface through the lenticular body, wherein the container body acts as an absorbing element towards the light beam and the lenticular body acts as a transmissive element of the light beam. The method also includes the steps of providing optical devices for changing the divergence of the portions of laser beams outgoing from the fibres, so as to collimate them overall along at least one predetermined optical axis, wherein it comprises the steps of: directing on a critical portion of the welding interface at least a first laser beam emitted by a respective fibre lying on an optical plane incident with said critical portion of the welding interface, wherein the optical plane identifies an angle of orientation between 0 and 45 degrees with a plane tangent to the critical portion of the welding interface.

Other embodiments of the present invention are described in the dependent claims.

BRIEF DESCRIPTION OF THE SEVERAL VIEWS OF THE DRAWINGS

Further characteristics and advantages of the present invention will be more clearly comprehensible from the description given below of its preferred and non-limiting embodiments, wherein:

FIGS. 1-3 are views from different angles of laser welding solutions of an automotive light according to the prior art;

FIGS. 7-10 are perspective views, in the assembled configuration, of automotive lights during welding steps according to the present invention, in which some elements have been omitted for a better view of some details;

The elements or parts of elements common to the embodiments described below will be indicated using the same reference numerals.

DETAILED DESCRIPTION

Figure 1:
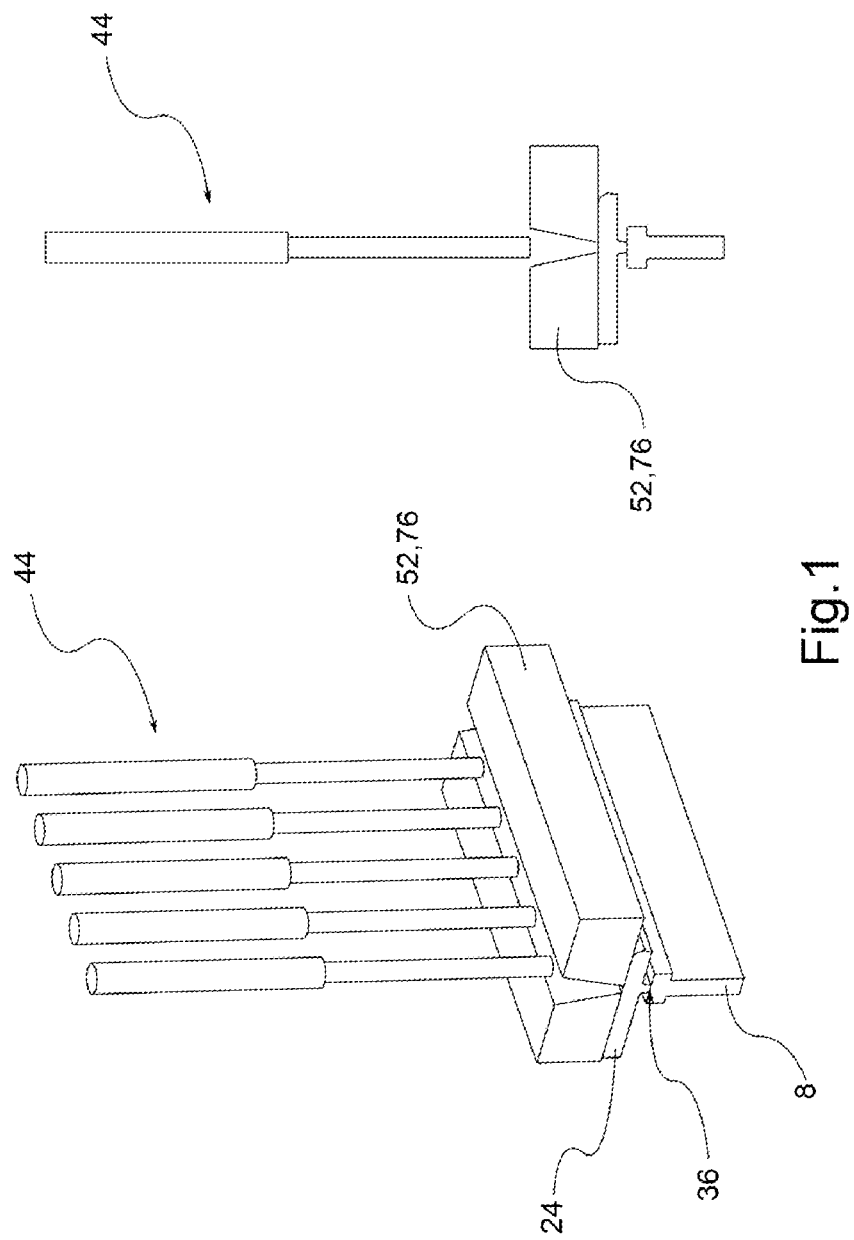
Figure 2:
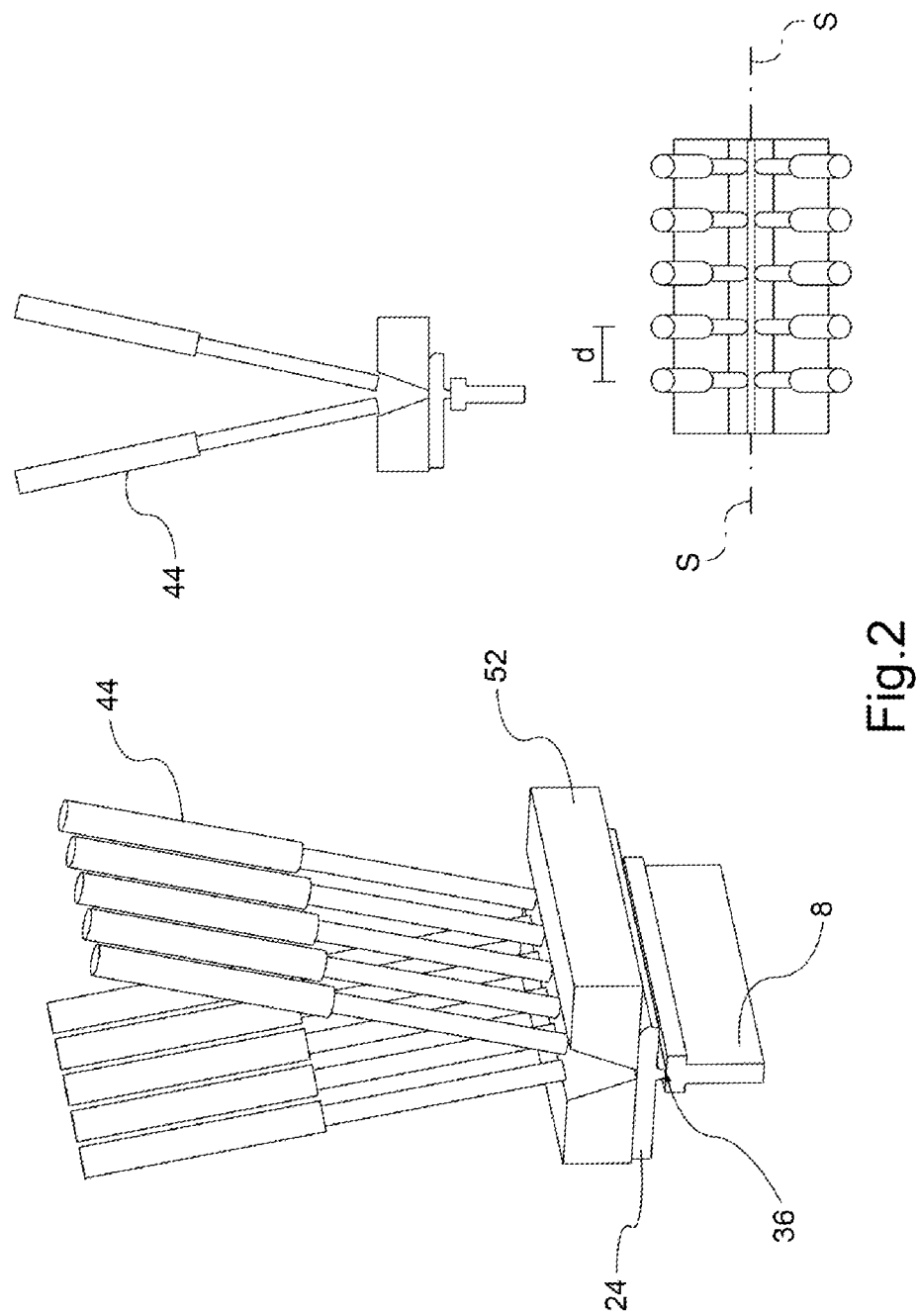
Figure 4:
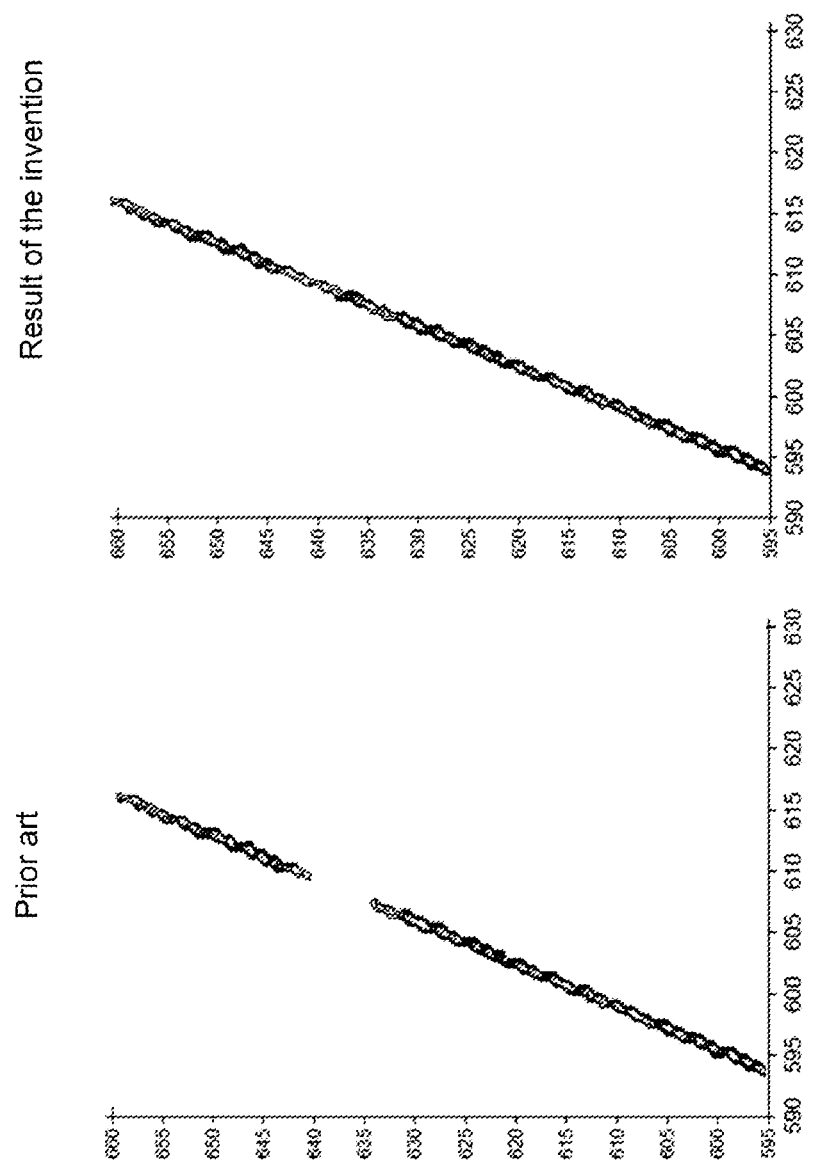
FIG. 4 is a comparison between the distribution of the laser beam which can be obtained with the prior welding techniques, and the distribution of the same laser beam which can be obtained according to the present invention.
Figure 5:
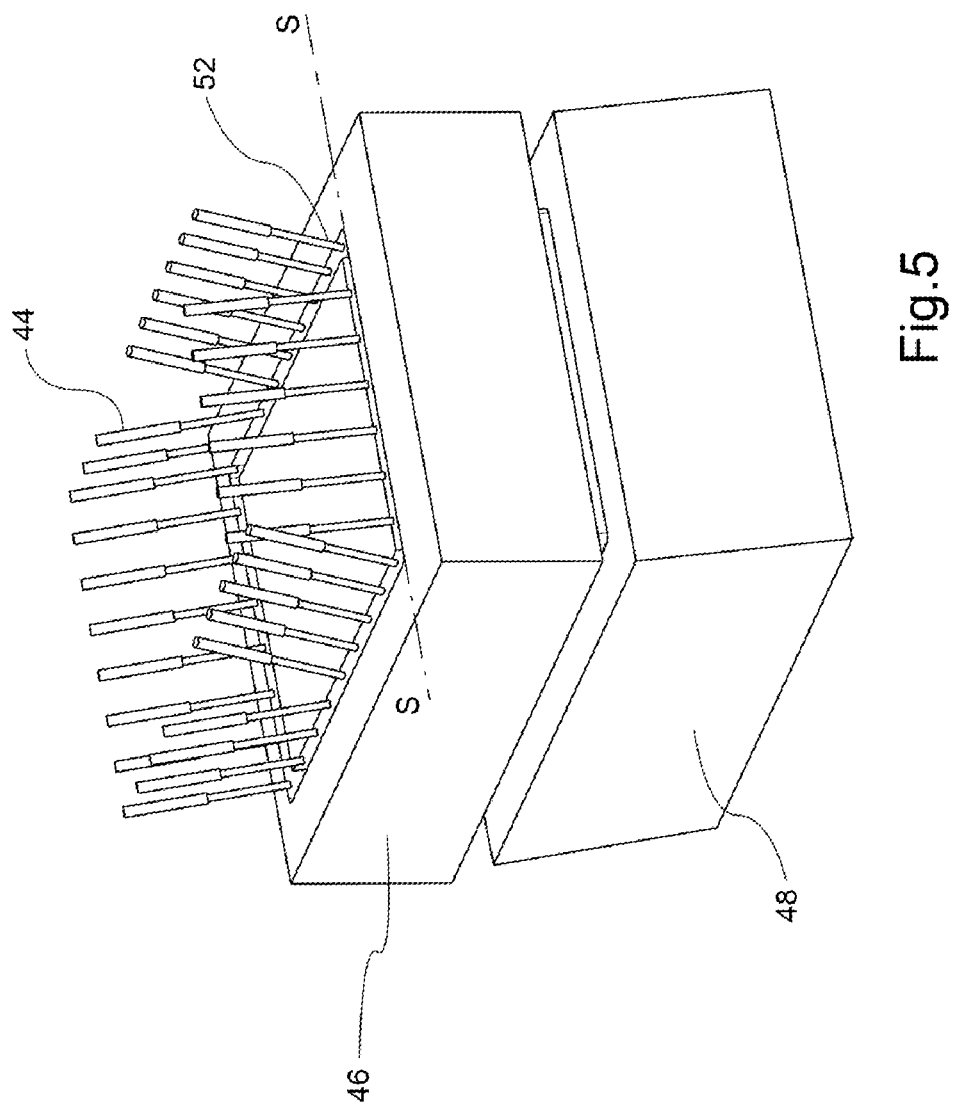
FIG. 5 is a perspective view of welding equipment, in an assembled configuration, according to the present invention.
Figure 6:
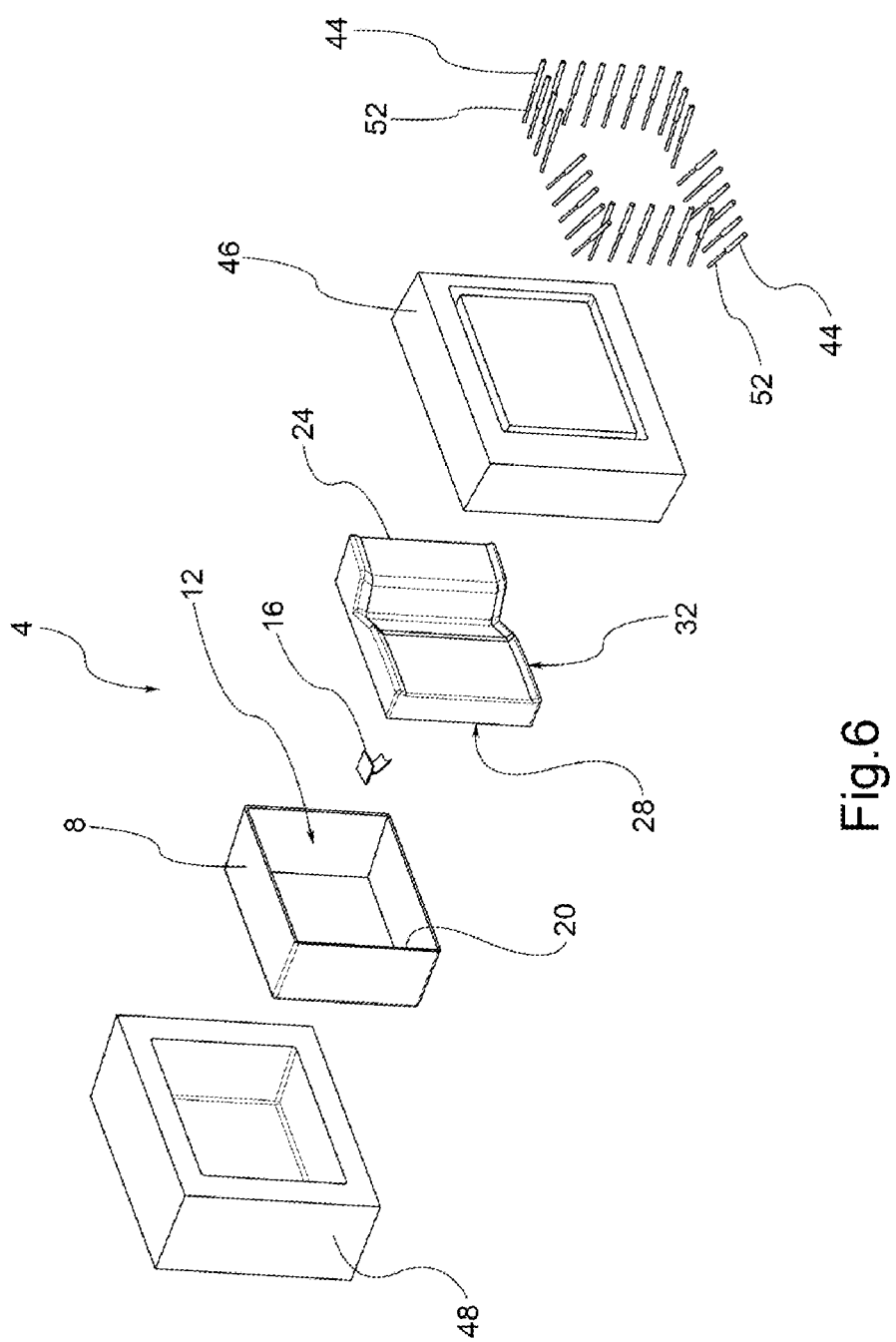
FIG. 6 is a perspective view in separate parts of the equipment in FIG. 3.

With reference to the aforementioned figures, reference numeral 4 globally denotes an automotive light, which the description which follows refers to without by so doing losing its general application.

As mentioned above, the term automotive light is understood to mean indifferently a rear automotive light or a front automotive light, the latter also known as a headlight.

As known the automotive light comprises at least one outer light of the vehicle having a lighting and/or signalling function, such as for example a sidelight, which may be a front, rear or lateral sidelight, an indicator light, a brake light, a rear fog light, a dipped beam headlight, a main beam headlight and the like.

The automotive light 4 comprises a container body 8, usually of polymeric material, which typically permits the attachment of the automotive light 4 to the relative vehicle.

For the purposes of the present invention the container body 8 may be any shape and size and may even be an element inside the automotive light, for example, not directly associated for example to the bodywork or other fastenings of the associable vehicle.

According to one embodiment, the container body 8 delimits a containment housing 12.

According to one embodiment, the containment housing 12 which houses at least one light source 16, is electrically connected to electric connection means for supplying power to the same, and is adapted to emit a light beam to propagate outside the automotive light 4.

For the purposes of the present invention the type of light sources 16 used is irrelevant; preferably, the light source 16 is a light source of light emitting diodes (LED).

The container body 8 is delimited by a first perimetral profile 20.

A lenticular body 24 in turn delimited internally by a second perimetral profile 28 is joined to the container body 8.

The lenticular body 24 is also delimited externally by an outer edge 32 corresponding to said second perimetral profile 28.

For the purposes of the present invention the lenticular body 24 may be either external to the automotive light 4, so as to define at least one outer wall of the automotive light directly subject to the atmosphere; for the purposes of the present invention the lenticular body may also be internal to the automotive light 4, i.e. not directly subject to the external atmosphere and in turn covered directly or indirectly by one or more screens or covering panels.

According to a possible embodiment, the lenticular body 24 is suitable to close the containment seat 12; according to one embodiment, the lenticular body 24 is suitable to transmit to the outside of the automotive light 4 the light beam produced by the light source 16.

To such purpose, the lenticular body 24 is made of at least partially transparent or semi-transparent or translucent material, and may also comprise one or more opaque portions, so as to allow in any case the at least partial crossing of the light beam produced by the light source 16.

The second perimetral profile 28 is counter-shaped relative to the first perimetral profile 20 so as to be coupled with the latter according to a shaped coupling, in the assembled configuration of the automotive light 4.

The assembly of the automotive light 4 comprises the step of joining at least partially to each other the respective first and second perimetral profiles 20, 28. For example, the step is provided for of arranging the lenticular body 24 to close the containment housing 12 of the container body 8 so as to join the respective first and second perimetral profiles 20, 28, Following the joining of the respective first and second perimetral profiles 20, 28 of the container body 8 and of the lenticular body 24 the contact surface between said perimetral profiles 20, 28 defines a welding interface 36 which extends along a curve defined by a curvilinear abscissa S.

The method of manufacture of the automotive light according to the present invention provides for joining to each other the lenticular body and the container body, in correspondence of said perimetral profiles 20, 28, by laser welding.

For the purposes of the present invention the laser welding process may be realized with different techniques, for example, with simultaneous laser welding, almost-simultaneous laser welding, border laser welding, mask laser welding, radial laser welding, globe laser welding, etc.

In the description which follows however, specific reference will be made to simultaneous laser welding without by so doing losing its general application.

In particular, at least one laser emitter device or laser source (not shown) is provided for, which emits a laser beam or a light beam or an electromagnetic radiation having a characteristic emission spectrum. Characteristic emission spectrum is taken to mean an electromagnetic radiation emitted substantially at a certain frequency or having a certain wavelength. According to possible embodiments, the laser source comprises a $CO_2$ laser, in which the laser beam is produced by a gas mixture comprising $CO_2$, or a YAG laser, in which the laser beam is produced by a solid state crystal, or a laser diode (LED).

The laser emitter device is associated, for example, to a plurality of optical fibres 44 inserted for example in a support or matrix, in a known manner.

Said fibres 44 may then be divided or split into further groups or bundles.

The fibres 44 receive portions of the laser beam emitted by the laser emitter device and direct them towards the welding interface 36 through the lenticular body 24. In other words, each fibre 44 receives a portion of laser beam and directs it towards the welding interface 36.

For example, the fibres 44 may be mechanically fixed to a mask 46.

The welding preferably takes place after blocking the container body 8 in a respective attachment block 48.

During the laser welding step, the container body 8 acts as an absorbing member towards the light beam emitted by the laser emitter device and the lenticular body 24 acts as a transmissive member of said light beam.

According to one embodiment, optical devices 52 are provided to change the divergence of the beam in output from the fibres 44; the change in the divergence of the beam is not necessarily symmetrical; for example, said optical devices 52 may decrease the divergence of the beam in one direction and increase it in another; according to one embodiment, the laser beam in output from the fibres 44 is collimated overall along at least a given optical axis X-X.

According to possible embodiment, the welding method according to the present invention comprises the step of identifying at least one discontinuity 54 on the outer edge 32 of the lenticular body; as better described below, said discontinuity constitutes a change in the distance 55 between the outer edge 32 and the welding interface 36.

Said discontinuity 54 may for example comprise both a concave portion, i.e. a reduction of the distance between the outer edge 32 of the lenticular body 24 and the second perimetral profile 28, and a convex portion, i.e. an increase of the distance between the outer edge 32 of the body lenticular 24 and the second perimetral profile 28.

For example, said variation in distance may have a substantially 'U' or 'V' shape; according to further possible embodiments said discontinuity may for example have an 'L' or 'S' shape.

A detailed discussion of the concept of discontinuity 54 on the outer edge 32 of the lenticular body 24 will be provided below.

Figure 13:
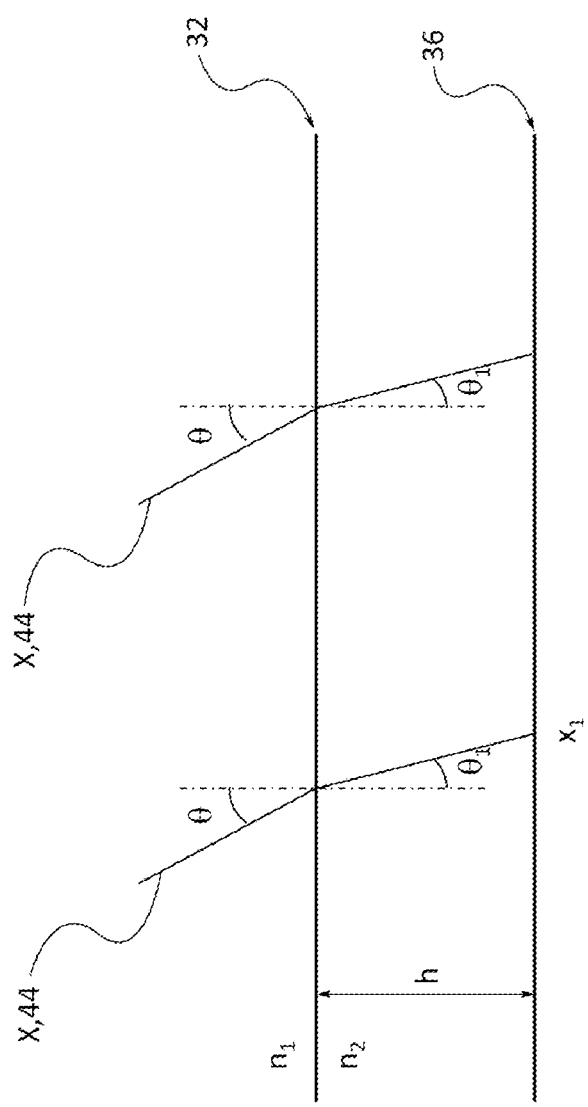
FIGS. 13-16 show geometric constructions suitable to define the concept of discontinuity according to the present invention.

In particular, FIG. 13 shows a welding system 44 with the fibres parallel to each other and no discontinuities in the surface or outer edge 32 of the lenticular body 24.

The fibres are inclined with respect to the lines perpendicular to the surfaces of the lenticular body by the angle ☐, due to the refraction at the interface it follows that:

$$\theta_1 = \arcsin\left(\frac{n_1}{n_2}\sin\theta\right)$$

where n1 and n2 are the refractive indices of air and the material of the lenticular body 24.

A coordinate x1 is identified on the weld bead depending on the height h of the lenticular body 24.

$$x_1 = h \tan \theta_1$$

Figure 14:
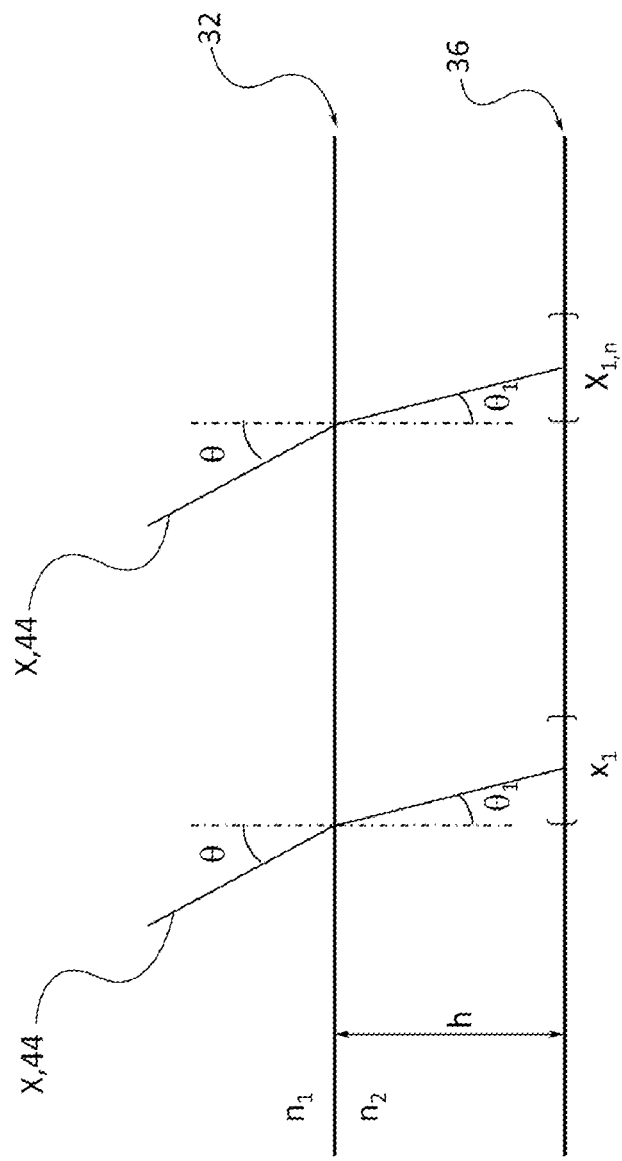

The area irradiated by the radiation is located in a neighbourhood of x1 which depends on the divergence of the laser beam and on its shape (FIG. 14).

In order to have an effective welding there must be no dark, shadow or uneven irradiation areas of the interface or weld bead 36. In general the parameters affecting homogeneity, having established the angle of inclination of the fibres with respect to the lines perpendicular to the surface and the height of the lenticular body 24, are the distance "d" between the fibres 44 and the shape of the laser beam, for example, Gaussian. Experimentally it has been found that along the welding interface 36, the irradiation must be at least 25% of the maximum peak irradiation (FIG. 15).

Figure 15:
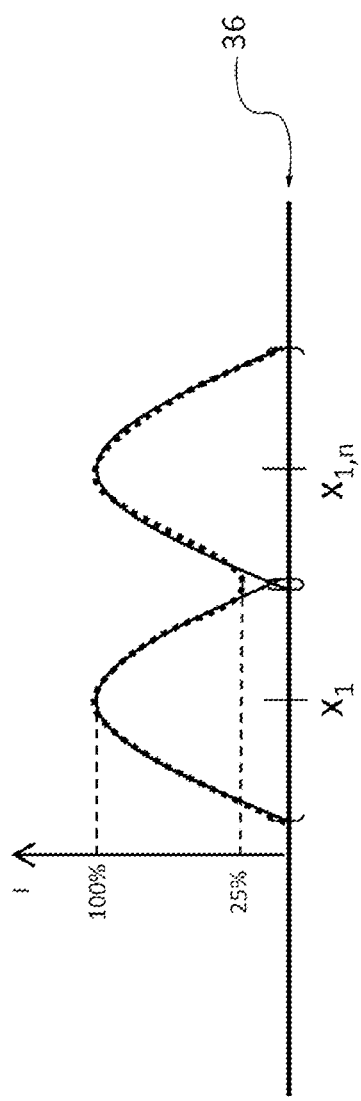

FIG. 15 shows the irradiation value on the y-axis ranging from 0 to 100% corresponding to the peak value; the threshold value of 25% is also highlighted; it has been seen that said value represents the threshold for obtaining a quality weld.

In the case in which the outer edge 32 has an inconstant or irregular profile the presence of a discontinuity 54 may be seen.

Figure 16:
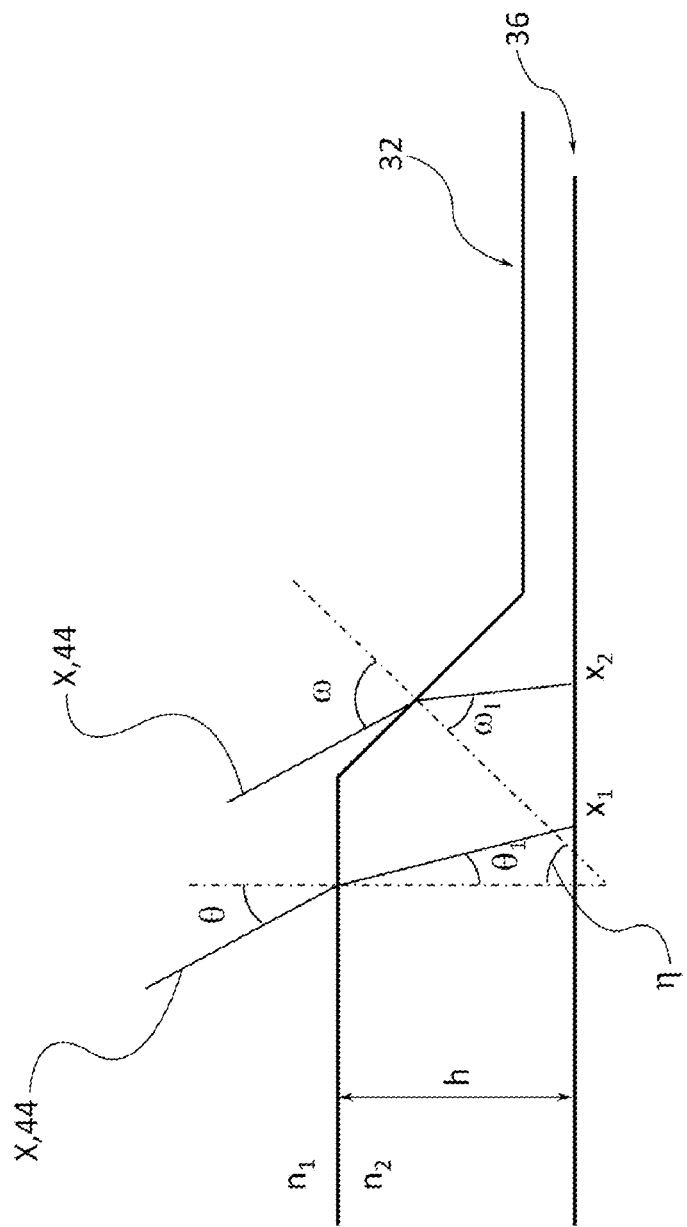

In particular, reference is made to a welding system with fibres 44 parallel to each other and with discontinuities 54 in the lenticular body. The discontinuity 54 causes an inclination equal to the angle □ of the straight lines perpendicular to the surface (FIG. 16).

In this case, $$\theta_1 = \arcsin\left(\frac{n_1}{n_2}\sin\theta\right)$$

$$\omega_1 = \arcsin\left(\frac{n_1}{n_2}\sin\omega\right)$$

On account of the discontinuities the lines perpendicular to the surfaces are inclined to each other by the angle □:

$$\omega = \theta + \eta$$

i.e.

$$\omega_1 = \arcsin\left[\left(\frac{n_1}{n_2}\right)\sin(\theta + \eta)\right]$$

The following points are thus defined on the weld bead depending on the height h:

$$x_1 = h \tan \theta_1$$

$$x_2 = h \tan \omega_1$$

The area irradiated is located in a neighbourhood of x1 and x2 which depends on the divergence of the beam and on its shape (e.g. Gaussian).

The discontinuity 54 of the lenticular body 24 may be defined as the angular variation of the lines perpendicular to the surface or outer edge 32 of the lenticular body 24 which generates a distance between adjacent irradiated zones x1 and x2 such that, between them, the irradiation on the welding interface 36 is less than 25% of the peak value.

The method comprises the step of directing at least a first laser beam 60 on a critical portion 64 of welding interface 36, wherein the first laser beam 60 has a respective optical axis X-X which lies on an optical plane P incident with said critical portion 64 of the welding interface 36.

According to one embodiment, the critical portion 64 of the welding interface 36 corresponds to said discontinuity 54.

Figure 11A:
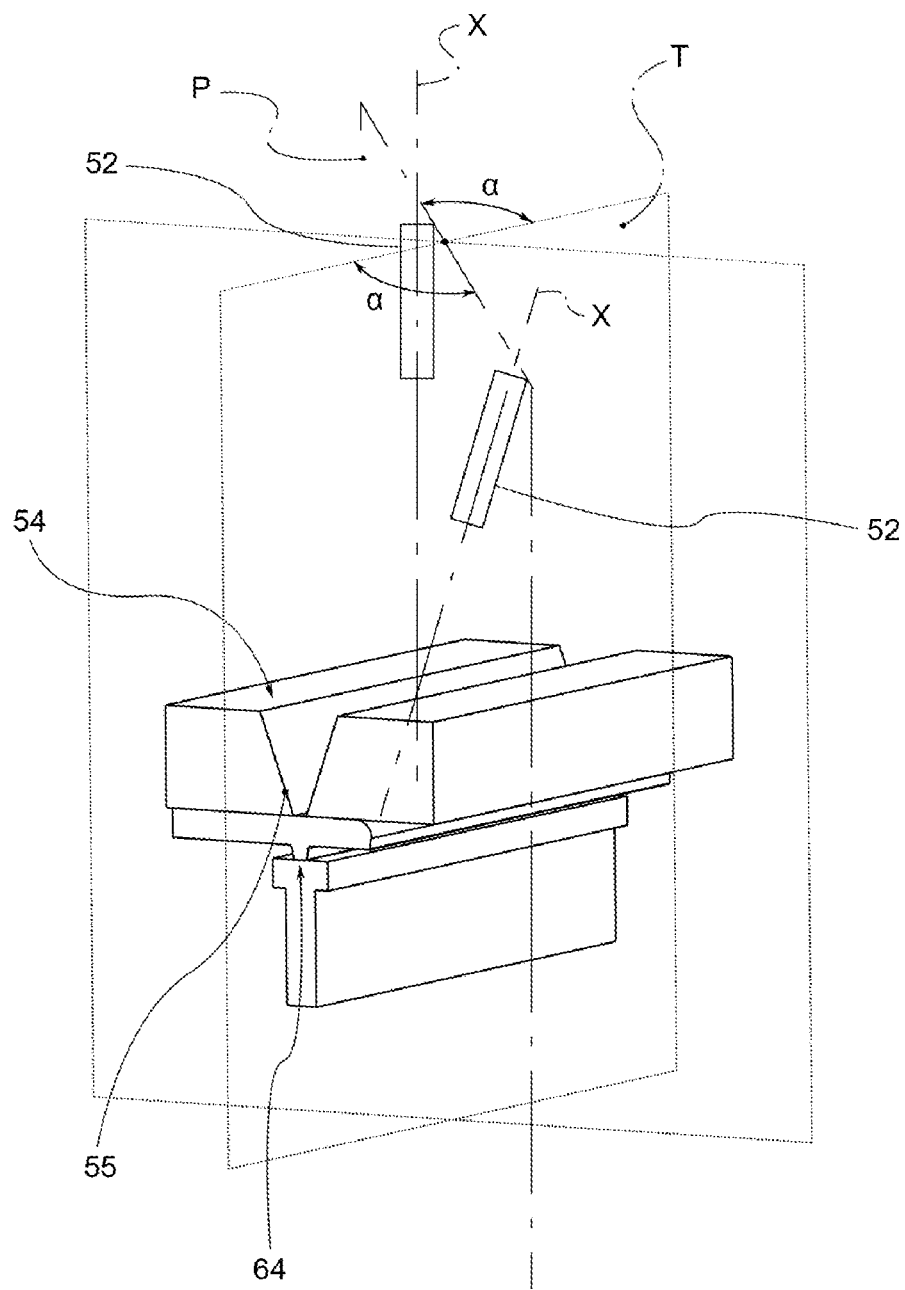
FIGS. 11*a*-11*b* are schematic views of different types of an enlarged detail of an automotive light welded according to a welding method according to the present invention.
Figure 11B:
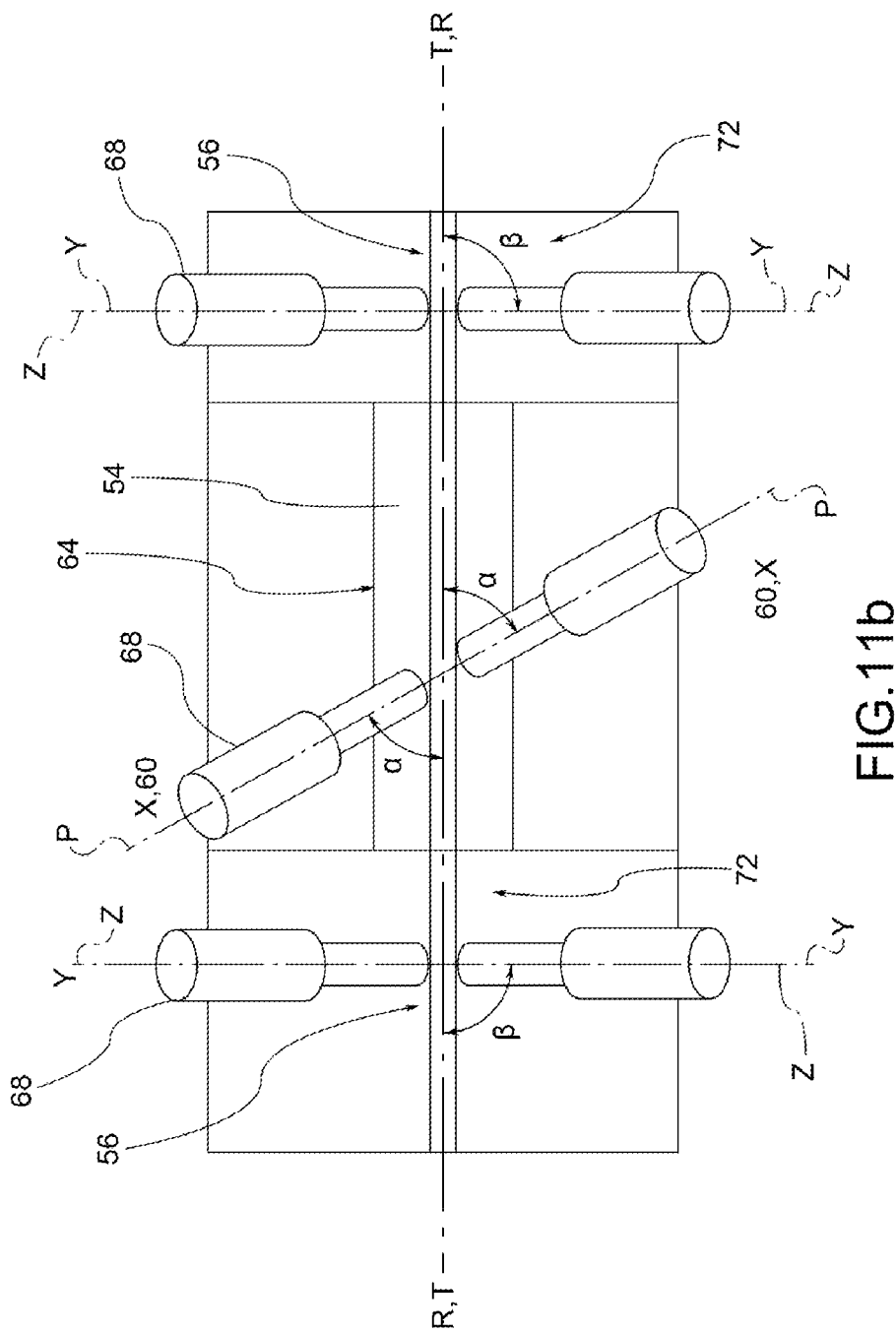
Figure 12:
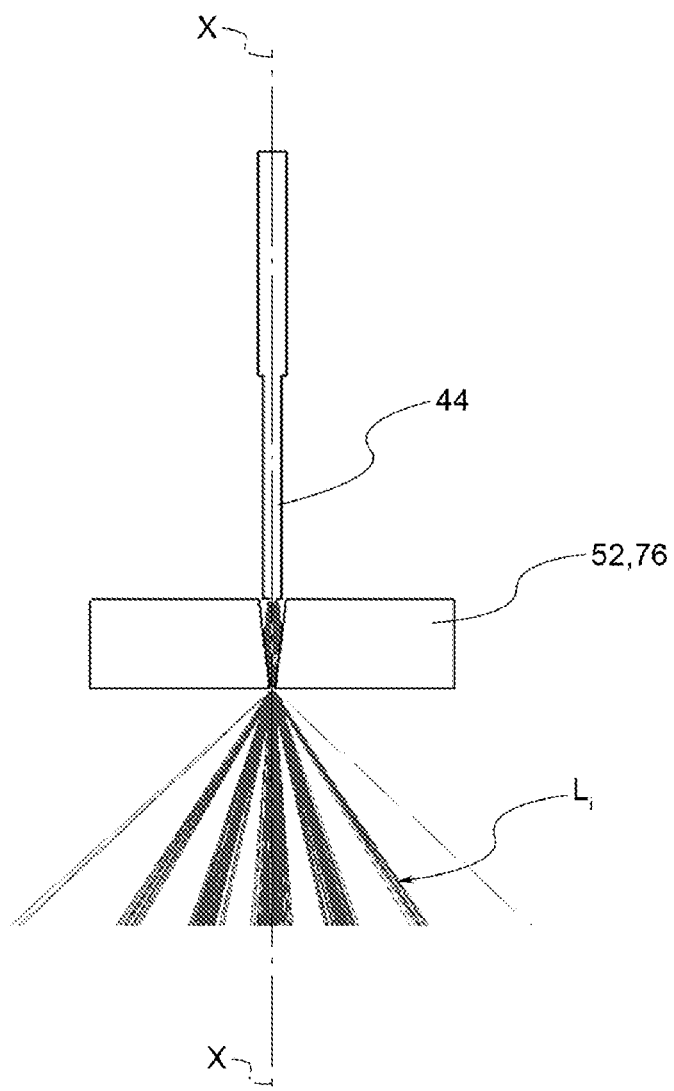
FIG. 12 is a schematic view of a subdivision into lobes of a laser beam passing through a negative light guide, according to a possible embodiment of the present invention.

In one embodiment, the optical plane P identifies an angle of orientation α between 0 and 45 degrees (FIG. 11a) with a plane T tangent to the critical portion 64.

According to a further embodiment, the optical plane P identifies an angle of orientation α between 0 and 30 degrees with a plane T tangent to the critical portion 64.

According to a further embodiment, the optical plane P identifies an angle of orientation α between 0 and 10 degrees with a plane T tangent to the critical portion 64.

According to a possible embodiment, the optical plane P is substantially parallel to a plane T tangent to the critical portion 64.

It is to be noted that the critical portion 64 is substantially assimilated to a portion tangent to the corresponding curvilinear abscissa s, defined above.

In other words, a curved portion of the welding interface 36 is assimilated to a corresponding tangent portion which identifies the direction of the tangent plane T.

The critical portion 64 is understood to mean the portion of welding interface 36 corresponding, i.e. aligned, in a direction perpendicular to said welding interface, with the discontinuity 54.

Said portion of welding interface 36 is defined as a critical portion 64 given that, on account of the geometry of the lenticular body 24, i.e. on account of the presence of said discontinuity 54, it is difficult to reach with the laser beam emitted by the fibres 44; in other words the geometry of the discontinuities tends to deviate the laser beam which fails, in the solutions of the prior art, to optimally reach the corresponding (i.e. underlying) portion of welding interface 36, for said reason defined 'critical'. In other words again, the geometry of said discontinuity, applying the methods of the prior art, produces a sort of shadow area poorly irradiated and hard to irradiate by the laser beam coming from the fibres 44.

Advantageously, according to the present invention, the orientation of the optical plane P with the plane T, tangent to the critical portion 64, by an angle of orientation α between 0 and 45 degrees allows an optimal irradiation of the critical portion 64.

It is also possible, in order to increase the degree of irradiation of the critical portion 64, to provide for the step of directing a pair of laser beams 68 on the critical portion 64 of the welding interface 36; according to one embodiment, said critical portion 64 of the welding interface 36 corresponds to the discontinuity 54.

In particular, said laser beams 68 have respective optical axes X-X lying on the same optical plane P parallel to said critical portion 64, in which said optical axes X-X are arranged symmetrically on opposite sides of a midpoint M of the critical portion 64 of the welding interface 36.

According to one embodiment, the method comprises the step of directing a plurality of 'n' laser beams, each distributed by a respective fibre 44, on the critical portion 64 of welding interface 36, said laser beams having respective optical axes X lying on the same optical plane parallel to said critical portion 64 of the welding interface 36.

The pair of laser beams 68 comprises optical axes X-X inclined on the respective optical plane P to compensate for the refraction of the laser beams 68 which occurs at the incidence of the laser beam on the outer edge 32 of the lenticular body 24.

In the presence of portions of the lenticular body 24 without discontinuities 54 or changes in the distance between the outer edge 32 of the lenticular body 24 and the second perimetral profile 28, a step is provided for of directing at least one laser beam, on a corresponding non-critical portion 72 of the welding interface 36.

In particular, said laser beam 60 has a respective optical axis Y-Y lying on a second optical plane Z incident with said non-critical portion 72 of the welding interface 36, wherein the second optical plane Z identifies with a plane R tangent to the non-critical portion 72, an angle of orientation β between 46 and 90 degrees.

According to a possible embodiment, the laser beam has a respective optical axis X-X which lies on a second optical plane Z substantially perpendicular to said non-critical portion 72 of the welding interface 36.

It is also possible to provide for directing a pair of laser beams 68 on the non-critical portion 72 of the welding interface 36, said laser beams 68 having respective optical axes X-X lying on the same second optical plane Z incident on said non-critical portion 72 of the welding interface 36, wherein said optical axes X-X are arranged symmetrically on opposite sides of the non-critical portion 72 of the welding interface 36.

According to one embodiment, a step is provided for of directing a plurality of 'n' laser beams, each distributed by a respective fibre 44, on the non-critical portion 72 of the welding interface 36, said laser beams having respective optical axes X lying on the same optical plane parallel to said non-critical portion 72.

As mentioned above, the welding method provides for the use of optical devices 52 to change the divergence of the laser beam 60, 68 in output from the fibres 44.

According to one embodiment, said optical devices 52 comprise a negative light guide 76 provided with an input 80 and an output 84, wherein the input 80 is facing said fibres 44 and the output 84 is facing said lenticular body 24. For example, the negative light guide 76 comprises a pair of reflecting walls 88 specularly inclined relative to an intermediate plane 92 on which said optical axis X-X of the laser beam 60, 68 lies, so as to converge towards the lenticular body 24.

In other words, the inclined walls are convergent so as to define an overall wedge-shaped geometry which tapers moving from the fibres 44 towards the lenticular body 24, as well as from the input 80 to the output 84.

According to one embodiment, the output 84 of the negative light guide is counter-shaped to the outer edge 32 of the lenticular body 24, so as to form a shaped coupling with the outer edge 32 of the lenticular body 24. This way it is possible to use the negative light guide as a presser device of the lenticular body 24 against the container body 8, to facilitate the welding and/or partial interpenetration of the first and the second perimetral profiles 20, 28.

As seen, a negative light guide tends to distribute the laser radiation from said output 84 according to a spatial distribution comprising a plurality of portions or lobes Ln, wherein at least one lobe L0 extends along said optical axis X-X. In other words, according to the present invention, the fibre 44 tilts so as to have at least one lobe L0 which extends along said optical axis X-X, so as to direct said lobe L0 on the welding interface 36.

According to a further embodiment, the light beam distributed from the output 84 of the negative light guide 76 comprises a plurality of lobes Li, directed towards the lenticular body 24, said lobes Ln having an 'n' level, where 'n' is the number of reflections which the lobe undergoes passing through the lenticular body 24 before impacting on the welding interface 36. Lobes of different degree impact on the welding interface crossing the lenticular body and undergoing a different number of reflections inside the lenticular body 24.

Preferably at least one lobe L0 is produced having a '0' degree which impacts on the welding interface 36 crossing the lenticular body 24 without undergoing reflections inside the latter.

According to a further embodiment, the optical device 52 comprises a solid body, i.e. a positive light guide, suitable for satisfying the condition of total internal reflection for the at least one portion of laser beam, the solid body extending from an input to an output, wherein the input is facing said fibres 44 and the output is facing said lenticular body 24; in such embodiment the solid body is composed of a material transparent to the emission wavelength of the laser beam.

It is to be noted that, both in the case of a negative light guide and in the case of a positive light guide the light guide controls, or distributes, the laser radiation along the plane transversal to said light guide, while not controlling the laser radiation along the plane longitudinal or tangent to said light guide.

As may be appreciated from the description, the manufacturing method according to the invention makes it possible to overcome the drawbacks of the prior art.

In particular, thanks to the method of the present invention it is possible to also apply the technique of laser welding to automotive lights having any type of complex geometry, having curvatures and thicknesses highly variable along the perimeter of the light.

The laser welding technique according to the present invention is not only not inconvenient compared to alternative welding techniques of the prior art but may even be better both in terms of cost and time, for the same quality of the welding joint, compared to the solutions of the prior art in the field of automotive lights.

In particular, there is a reduction of consumption and therefore of costs since a greater part of the light beam can be transmitted to the welding interface between the lenticular body and the container body.

The light beam on the interface portion of welding between the lenticular body and the container body is thus suitable to obtain a welded joint having excellent mechanical qualities, without waste of luminous power.

Moreover, by providing a light guide portion which cooperates with the light guide of the distributor of the laser radiation it is possible to control more efficiently the laser radiation intended for the welding area with respect to the teaching of the prior art, especially in the laser welding of lenticular bodies having surface discontinuities. In the present case, at least one lobe of the laser radiation distribution at the output of the mouth of the laser radiation distributor may be able to bypass a possible surface discontinuity of the lenticular body, since it can reach its destination conveyed in the light guide portion of the lenticular body.

A person skilled in the art may make numerous modifications and variations to the methods of manufacture of automotive lights described above so as to satisfy contingent and specific requirements while remaining within the sphere of protection of the invention as defined by the following claims.

The invention claimed is:

1. Method of manufacture of an automotive light comprising the steps of:
   providing a container body delimited by a first perimetral profile, providing a lenticular body, internally delimited by a second perimetral profile and externally by an outer edge corresponding to said second perimetral profile, mutually associating at least partially the respective first and second perimetral profiles of the container body and of the lenticular body, the contact surface between said perimetral profiles defining a welding interface which extends along a curve defined by a curvilinear abscissa, providing at least one laser emitting device which emits a light beam or radiation having a characteristic emission spectrum, providing a plurality of fibres which receive portions of the laser beam from the laser emitting device and direct them towards the welding interface through the lenticular body, wherein the container body acts as an absorbing element towards the light beam and the lenticular body acts as a transmissive element of the light beam, providing optical devices for changing the divergence of the portions of laser beams outgoing from the fibres, so as to collimate them overall along at least one predetermined optical axis, wherein it comprises the steps of:

directing on a critical portion of the welding interface at least a first laser beam emitted by a respective fibre lying on an optical plane incident with said critical portion of the welding interface, wherein the optical plane identifies an angle of orientation between 0 and 45 degrees with a plane tangent to the critical portion of the welding interface.

2. Method of manufacture of an automotive light according to claim 1, wherein the optical plane identifies an angle of orientation between 0 and 30 degrees with a plane tangent to the critical portion.

3. Method of manufacture of an automotive light according to claim 1, wherein the optical plane identifies an angle of orientation between 0 and 10 degrees with a plane tangent to the critical portion.

4. Method of manufacture of an automotive light according to claim 1, wherein the optical plane is parallel to a plane tangent to the critical portion.

5. Method of manufacture of an automotive light according to claim 1, comprising the step of directing a pair of laser beams on the critical portion of the welding interface, said laser beams having respective optical axes lying on the same optical plane parallel to said critical portion, wherein said optical axes are arranged symmetrically on opposite sides with respect to a midpoint of the critical portion of the welding interface.

6. Method of manufacture of an automotive light according to claim 1, comprising the step of directing a plurality of laser beams, each distributed by a respective fibre, on the critical portion of the welding interface, said laser beams having respective optical axes lying on the same optical plane parallel to said critical portion.

7. Method of manufacture of an automotive light according to claim 1, wherein the fibres which receive portions of laser beams comprise optical axes inclined on the respective optical planes so as to compensate for the refraction of the laser beams which occurs at the incidence of the laser beam on the outer edge of the lenticular body.

8. Method of manufacture of an automotive light according to claim 1, comprising the steps of:

identifying at least one discontinuity or change in the distance between the outer edge and the welding interface, directing at least the first laser beam emitted by the respective fibre on the critical portion of the welding interface, said critical portion being corresponding to said discontinuity, the first laser beam having a respective optical axis lying on an optical plane incident with said critical portion of the welding interface, wherein the optical plane identifies an angle of orientation between 0 and 45 degrees with a plane tangent to the critical portion.

9. Method of manufacture of an automotive light according to claim 8, wherein said discontinuity comprises a concave portion, so as to obtain a reduction of the distance between the outer edge of the lenticular body and the second perimetral profile.

10. Method of manufacture of an automotive light according to claim 8, wherein said discontinuity comprises a convex portion, so as to obtain an increase of the distance between the outer edge of the lenticular body and the second perimetral profile.

11. Method of manufacture of an automotive light according to claim 8, wherein said discontinuity of the lenticular body is defined by an angular variation of the lines perpendicular to the surface or outer edge of the lenticular body which generates a distance between adjacent irradiated zones of the welding interface such that, between them, the irradiation of the first laser beam on the welding interface is less than 25% of the peak value.

12. Method of manufacture of an automotive light according to claim 8, wherein said discontinuity has a substantially 'U' or 'V' shape.

13. Method of manufacture of an automotive light according to claim 8, wherein in the presence of portions of the lenticular body without discontinuity or change in the distance between the outer edge of the lenticular body and the welding interface, there is provided the step of directing at least the first laser beam, emitted by the corresponding fibre, on a corresponding non critical portion of the welding interface, said laser beam having a respective optical axis lying on a second optical plane incident with said non critical portion of the welding interface, wherein the second optical plane identifies an angle of orientation between 46 and 90 degrees with a plane tangent to the non critical portion.

14. Method of manufacture of an automotive light according to claim 13, wherein said at least the first laser beam has a respective optical axis lying on a second optical plane substantially perpendicular to said non critical portion of the welding interface.

15. Method of manufacture of an automotive light according to claim 13, comprising the step of directing a pair of laser beams on the non critical portion of the welding interface, said laser beams having respective optical axes lying on the same second optical plane incident on said non critical portion of the welding interface, wherein said optical axes are arranged symmetrically on opposite sides with respect to the non critical portion of the welding interface.

16. Method of manufacture of an automotive light according to claim 13, comprising the step of directing a plurality of laser beams, each distributed by a respective fibre, on the non-critical portion of welding interface, said laser beams having respective optical axes lying on the same optical plane parallel to said non critical portion of welding interface.

17. Method of manufacture of an automotive light according to claim 1, wherein said optical devices for changing the divergence of the laser beam coming out from the fibres comprise a negative light guide having an input and an output, the input facing said fibres and the output facing said lenticular body, and a pair of reflective walls specularly inclined with respect to an intermediate plane whereon said optical axis of the laser beam lies, so as to converge toward the lenticular body.

18. Method of manufacture of an automotive light according to claim 1, wherein the output of the guide light is counter-shaped relative to the outer edge of the lenticular body, so as to form a shape coupling with the outer edge of the lenticular body.

19. Method of manufacture of an automotive light according to claim 17, wherein said negative light guide distributes the laser radiation from said outlet according to a spatial distribution comprising a plurality of portions or lobes, wherein at least one lobe extends along said optical axis.

20. Method of manufacture of an automotive light according to claim 19, comprising the step of producing the at least one lobe having degree 0 which incises on the welding interface through the lenticular body without undergoing reflections within the latter.

21. Method of manufacture of an automotive light according to claim 19, wherein the method comprises the step of producing at least two lobes having different degrees, which incise on the welding interface through the lenticular body undergoing a different number of reflections within the lenticular body.

22. Method of manufacture of an automotive light according to claim 1, wherein the optical device for changing the divergence of the laser beam outgoing from the fibre comprises a solid body, i.e. a positive light guide, suitable for meeting the condition of total internal reflection for the at least one portion of laser beam, the solid body extending from an input to an output, the input facing said fibres and the output facing said lenticular body, wherein the solid body is made of a material transparent to the emission wavelength of the laser beam.

\* \* \* \* \*